Dec. 2, 1952     C. S. CARLSON     2,620,294
EXTRACTIVE DISTILLATION OF CLOSE-BOILING ALCOHOLS
Filed April 15, 1949
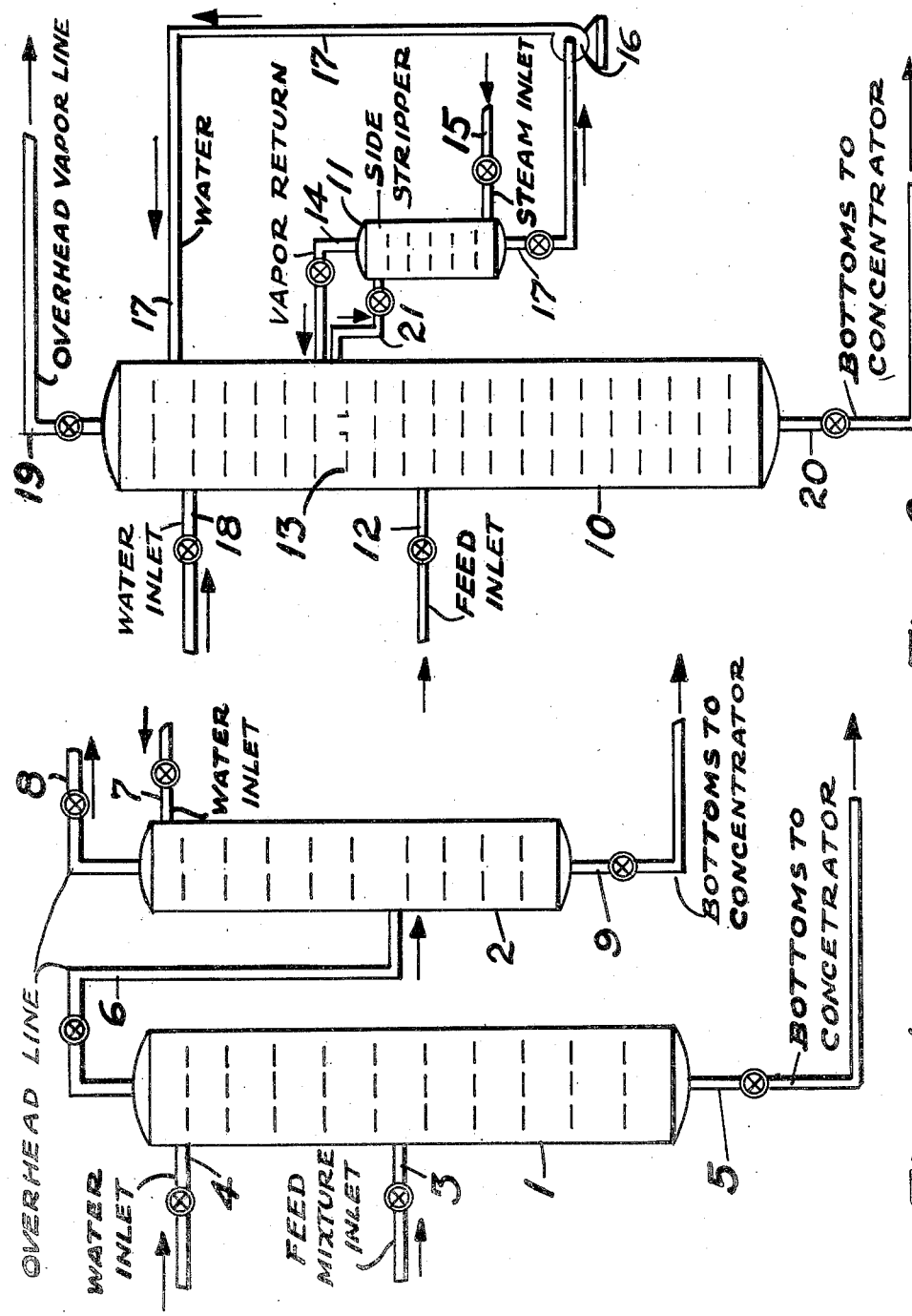

Patented Dec. 2, 1952

2,620,294

UNITED STATES PATENT OFFICE 2,620,294

EXTRACTIVE DISTILLATION OF CLOSE-BOILING ALCOHOLS

Carl S. Carlson, Elizabeth, N. J., assignor to Standard Oil Development Company, a corporation of Delaware Application April 15, 1949, Serial No. 87,610

9 Claims. (Cl. 202—39.5)

This invention relates to the use of aqueous distillation refluxing media for separating close-boiling oxygenated organic compounds at two distinctively controlled concentration levels.

More particularly, this invention is concerned with the separation of oxygenated organic compounds through modification of their relative volatilities during fractional distillation by dilution of internal reflux to a second level depending on the concentration of the organic compounds in the internal reflux.

The process of the present invention is best applied in fractionating distillation cuts or mixtures of which the organic components normally distill as compounds or azeotropes within a narrow-boiling range. An example is an aqueous mixture of ethyl alcohol (anhydrous B. P. 78.5° C.; aqueous azeotrope B. P. 78.1° C.) with isopropyl alcohol (anhydrous B. P. 82.4° C. and aqueous azeotrope B. P. 80.2° C.). Other examples include narrow-boiling range mixtures containing such alcohols and neutral oxygenated organic compounds of other classes, such as ketones, aldehydes, ethers, esters, ketals, and acetals, when such components or their azeotropes boil within a narrow range.

Some of the above-described mixtures are obtained by an olefin hydration reaction, e. g., the product obtained when a mixture of ethylene and propylene is adsorbed in sulfuric acid, diluted, hydrolyzed and resulting aqueous alcohol mixture is stripped out.

Another source of such mixtures is the product resulting from the catalytic hydrogenation of carbon monoxide, especially the aqueous layer product which contains not only primary and secondary alcohols but also various other neutral oxygenated organic compounds and certain tertiary alcohols. Still another source is found in the products of hydrocarbon oxidation where both oil and water layers are obtained, both yielding mixtures of oxygenated organic compounds. It is quite feasible to obtain the narrow-boiling range mixtures containing two or more close-boiling oxygenated organic compounds from the crude aqueous mixtures by conventional distillations. Examples of such narrow boiling range mixtures which may be obtained by ordinary distillation processes are the following alcohol mixtures:

TABLE I

Narrow-boiling range mixtures of alcohols

| | Components | Normal B.P. °C. | Aqueous Azeotrope B.P. °C. |
|---|---|---|---|
| Group I | methanol | 64.7 | |
| | ethanol | 78.3 | 78.1 |
| | isopropanol | 82.4 | 80.2 |
| Group II | normal propanol | 97.2 | 87.7 |
| | isobutanol | 107.9 | 88.9 |
| | secondary butanol | 99.5 | 88.5 |
| | tertiary pentanol | 101.8 | 87.0 |
| Group III | normal butanol | 117.7 | 92.2 |
| | iso-pentanol | 131.6 | 95.2 |
| | secondary pentanol | 119.2 | 92.3 |
| | normal pentanol | 137.9 | 95.0 |
| | pentanol-3 | 115.4 | 91.7 |

A narrow-boiling range mixture from which two or more of the organic components are to be separated in purified condition may be a binary or tertiary mixture as in the groups shown, but generally the crude mixtures contain additional oxygenated organic compounds which would tend to interfere with the separation if it were not for the basic operation of this invention. It is to be noted that the aqueous azeotropes of the organic compounds in such mixtures have boiling points which differ by less than five degrees centigrade.

The relative volatility of the organic components to be separated from the mixtures is the ratio of the volatility of one component to the other, the volatility of each component being proportional to its partial pressure divided by its mole fraction in the liquid phase. Thus, in a distillation of close-boiling alcohols, e. g., ethyl alcohol and isopropyl alcohol from an aqueous solution of these alcohols, separation is difficult because these alcohols form close-boiling aqueous azeotropes and have a very low relative volatility of approximately 1.07. The separation is likewise typical of the anhydrous alcohols because the relative volatility of ethanol to isopropanol under normal pressure is only 1.19. The same difficulty of separation by distillation owing to low relative volatilities occurs in attempts to separate other close-boiling alcohols and neutral oxygenated organic compounds, containing principally 1 to 6 carbon atoms per molecule.

This invention makes use of a newly found principle to obtain increased relative volatilities in separating the organic compounds from each other by extractive distillation employing water as the extractive distillation solvent by taking into account the fact that the relative volatilities of the organic compounds will vary with their concentrations in the aqueous refluxing medium. For example, with 92 mol percent water present as the solvent in the refluxing medium containing in solution 96 mol percent ethyl alcohol and 4 mol percent isopropyl alcohol, on an anhydrous basis the relative volatility of the isopropyl alcohol to the ethyl alcohol is approximately 1.7; but when the refluxing medium contains in solution 4 mol percent ethyl alcohol and 96 mol percent isopropyl alcohol, the relative volatility of the isoproply alcohol to the ethyl alcohol is 1.5. This means that it is more difficult to remove the last few percent of ethyl alcohol from isopropyl alcohol than it is to remove the last few percent of isopropyl alcohol from ethyl alcohol; and, in other words, when using a fractionating column of reasonable size with 92 mol percent water in the internal reflux, purified ethyl alcohol in dilute aqueous solution is readily recovered as bottoms but the isopropyl alcohol tends to be contaminated wtih ethyl alcohol. In general, it is desirable to recover both components as pure as possible.

By increasing the concentration of the solvent in the internal reflux, the relative volatility of the isopropyl alcohol with respect to the ethyl alcohol can be increased so as to reduce the amount of ethyl alcohol which reaches the top of the fractionating column, but the increased amount of solvent excessively dilutes the pure ethyl alcohol at the bottom of the column and lowers the efficiency. For example, with 95 mol percent water in the internal reflux when about 96 mol percent of the alcohols present therein is isopropyl alcohol, the relative volatility of the isopropyl alcohol to the ethyl alcohol is about 1.7, but the water load in the column wherein the purified ethyl alcohol bottoms is recovered becomes excessive. In accordance with the present invention, a procedure has been developed which permits the use of the high solvent concentrations where needed without excessive loading of the fractional distillation equipment.

By operating according to the present invention a lower average water concentration in the feed to the solvent stripping column is obtained. The present invention also makes possible separations or completeness of separations which otherwise may not be possible. For example, it is difficult to rid ethanol from the final few percent of the higher branched alcohols. In order to accomplish this separation very high solvent water concentrations are required during the extractive distillation process, but at these higher water concentrations some of the normal alcohols e. g. n-butanol also tend to appear in the overhead with the higher branched alcohols. E. g. at 94 mol % water concentration isopropanol and normal butanol have the same volatility in dilute solutions, as indicated in U. S. Patent 2,551,626 on their volatilities relative to that of ethanol. Lower water concentrations are necessary in the bottom of the extractive distillation column to keep the n-butanol in the column bottoms. By operating according to this invention at two different water concentration levels, i. e. a higher level in the top of the column and a lower level in the lower section of the column the desired separation may be accomplished.

A variety of mechanical arrangements may be used for conducting the process and an explanation will be given with respect to suitable arrangements shown diagrammatically in the drawings.

Figure 1 of the drawings illustrate diagrammatically a flow plan of a two column unit for obtaining separation of purified organic products from their mixture, e. g., a purified ethyl alcohol bottoms product and a purified isopropyl alcohol distillate product both of which products may be concentrated as such.

Figure 2 illustrated diagrammatically the flow plan of a more compact unit for accomplishing the described types of separation with a reduced number of columns by making use of a side stream stripping means.

Referring to Figure 1, which shows a two-column unit for separating isopropyl alcohol from ethyl alcohol and freeing the isopropyl alcohol of ethyl alcohol, tower 1 is the main fractional distillation column which produces a dilute aqueous solution of purified ethyl alcohol as bottoms and tower 2 is a secondary fractional distillation column which produces a more dilute aqueous solution of purified ethyl alcohol as bottoms with an overhead product isopropyl alcohol that is free of ethyl alcohol.

The mixed ethyl and isopropyl alcohol feed is introduced by line (3) into tower 1 where fractional distillation occurs in the presence of internal aqueous reflux containing between 90 and 95 mol % water, preferably about 92 mol % water, by supplying water at the top of the fractionating zone by line 4. Dilute aqueous purified ethyl alcohol free of isopropyl alcohol is withdrawn as bottoms liquid from tower 1 by line 5.

The vapor overhead product of tower 1 of high isopropyl alcohol content is not free of ethyl alcohol on account of the aforementioned difficulty of eliminating the last few percent of ethyl alcohol from a dilute aqueous solution of isopropyl alcohol, although the same dilution permits the ethyl alcohol to be readily freed of the last few percent of isopropyl alcohol. This vapor overhead is passed by line 6 into tower 2 for fractional distillation in the presence of internal reflux having a higher water content, e. g., between 95 and 100 mol % water, preferably about 97 mol %, from water supplied at the top through pipe 7.

Overhead vapor product of tower 2 containing isopropyl alcohol free of ethyl alcohol is withdrawn by line 8 for any further processing desired, such as, concentrating to obtain 91% isopropyl alcohol or anhydrous isopropyl alcohol. The aqueous bottoms of dilute ethyl alcohol from tower 2 is withdrawn by line 9 and may be combined with the bottoms stream 5 from tower 1 for concentrating ethyl alcohol purified of isopropyl.

In Figure 2 the means for accomplishing the separations with varied concentration levels of water in the internal reflux comprises the single fractional distillation column 10 with a side stream stripper 11. The mixed alcohols or oxygenated organic compounds to be separated are introduced by feed inlet 12 into an intermediate section of the fractional distillation zone 10. From a plate 13, above the feed inlet liquid is withdrawn as a side stream by line 21 and passed into the side stream stripper 11 for vaporizing and stripping the liquid of dissolved oxygenated compounds with some of the water vapor. The vapor evolved and fractionated in the side-stream stripper 11 is passed by a vapor return line 14 back into tower 10. Live steam, for heating and aiding the stripping is introduced by steam inlet line 15 into the bottom of the stripper 11. The stripped side-stream liquid which collects at the bottom of stripper 11 may thus be substantially free of oxygen-containing compounds and containing close to about 100 mol % water. Thus the water concentration in the column 10 below the feed point 12 is reduced to the desired level. This bottoms from the stripper 11 is circulated by pump 16 through the water return line 17 to an upper part of column 10 so as to supply a substantial proportion of the water concentration needed in the internal reflux that flows down through the upper section of the fractional distillation column 10. Supplementary make-up water may be introduced through inlet line 18 in the upper part of column 10 if needed. Accordingly, a high water concentration level is maintained in this upper section of column 10 between the side stream withdrawal plate 13 and the upper water inlet for preventing said components from remaining in the vapor phase which is withdrawn from column 10 through the overhead vapor line 19.

As indicated with reference to Figure 2, the water concentration in the internal reflux that passes down through the upper section of column 10 can be maintained at about 95–100 mol % water preferably about 97 mol %, for removing the last few percent of ethyl alcohol from isopropyl alcohol in such section; while in the lower section of column 10 below the feed inlet 12 a somewhat lower water concentration is maintained in the internal reflux e. g. between 90 and 95 mol % water, preferably about 92 mol %, which is adequate for removing from the descending stream of dilute ethyl alcohol the last few percent of isopropyl alcohol. The dilute aqueous bottoms e. g. ethyl alcohol free of isopropyl alcohol is withdrawn from the bottom part of column 10 through bottom draw-off line 20 for further processing such as concentration of ethyl alcohol. Accordingly, it can be seen that the overhead product can be completely freed of the component which is to be withdrawn in purified form as a bottoms product in the single tower with the side-stream stripper by maintaining a higher water concentration in the upper section than in the lower section of the tower.

A particularly suitable use that can be made of the means illustrated in Figure 2 for obtaining two different water concentration levels in the internal reflux occurs when the feed mixture of the oxygenated compounds to be separated has a very high water content, as for example, a water content of above 95 mole percent water initially. With this initial high water content in the feed it is advantageous to avoid increasing the water content of the already dilute solution that is to carry one of the components down through the fractionating column while stripping from this solution another of the initial components that is to be separated by extractive distillation at a higher water concentration level.

Although it has been described how the processes outlined are applicable specifically to the separation of ethyl alcohol from isopropyl alcohol, there are still other important uses of these same principles generally applicable to the separation of normal primary alcohols from branched alcohols with simultaneous removal of other oxygenated organic impurities. For example, in separating ethyl alcohol and normal propyl alcohol from isopropyl alcohol and branched butyl alcohols, if mixtures of these components are subjected to fractional distillation in the presence of a liquid reflux having an extremely high water concentration, the normal propyl alcohol will tend to be volatilized together with the branched alcohols and thus make the separation and recovery of normal propyl alcohol more complicated. Therefore, with such a mixture it is advantageous to restrict the water concentration of the internal reflux in the fractional distillation zone section where the branched alcohols and non-alcohol impurities are to be volatilized and thus separated from the normal alcohols remaining in the aqueous solution. A higher water concentration may then be maintained in the internal reflux during the subsequent fractional distillation of the separated vapors comprising the branched alcohols and non-alcohol impurities.

The following basic data illustrate how the branched alcohols, including isopropyl alcohol, are fractionally distilled to accomplish separation with the best selectivity from the normal alcohols in the presence of internal reflux having a water concentration level below 90 mole % with an optimum at about 88 mol %.

TABLE II

| Mol Percent H₂O | Alpha (Rel. Vol.)[1] | |
|---|---|---|
| | IPrOH to EtOH | IPrOH to n-PrOH |
| 100 | 1.76 | 1.14 |
| 97 | 1.67 | 1.21 |
| 5 | 1.61 | 1.26 |
| 2 | 1.54 | 1.33 |
| 0 | 1.50 | 1.38 |
|  | 1.49 | 1.40 |
| 88 | 1.47 | 1.43 |
| 85 | 1.42 | 1.50 |
| 80 | 1.36 | 1.56 |

[1] The relative volatility is the volatility of one component divided by that of the other, the volatility of each component being proportional to its partial pressure divided by its mol fraction in the liquid phase. It is also defined by the equation: $\text{Alpha} = (Y_1/Y_2)/(X_1 X_2)$ where Y refers to the vapor phase mol fractions of the components to be separated and X refers to the liquid phase mol fractions of the components to be separated, subscript 1 designates the more volatile components and subscript 2 the less volatile components.

The data in Table II demonstrate that in order to separate isopropyl alcohol from n-propyl alcohol effectively, water concentrations below 90 mol % are desired in order to maintain a reasonable alpha between isopropyl alcohol and n-propyl alcohol. Below 90 mol % water, however, the alpha between isopropanol and ethanol diminishes thus making this separation more difficult. Therefore, it becomes necessary to strike a balance. The necessary water concentration when using only one solvent level for this particular separation involving ethanol, isopropanol, n-propanol and branched butanols is 88 mol % water. To overcome the disadvantage of the compromise in solvent concentration just outlined, in this invention two different solvent levels are employed in predetermined fractionation zones, so that there is obtained a maximum split between each of the two sets of components being separated.

The branched butyl alcohols, like isopropyl alcohol, are similarly rendered sufficiently volatile in solutions of 80 to 90 mol % water to be separated with the isopropyl alcohol from the normal alcohols, for example ethyl alcohol, normal propyl alcohol, normal primary butyl alcohol and normal primary amyl alcohol. However, it is increasingly difficult to separate the last few percent of normal alcohol from the branched alcohols unless the relative volatility of the branched alcohols is increased with respect to the normal alcohols by increasing the water concentration of the reflux passed down through the fractional distillation zone in which such a separation is performed. The basic data given in the following Tables III and IV show the need of higher water concentrations in order to increase the volatilities of the branched alcohols relative to the normal alcohol when the normal alcohol is present to the extent of only a few percent.

TABLE III

*Relative volatility of IPrOH to EtOH as a function of alcohol ratio*

| Mol Percent $H_2O$ | Alpha (IPrOH:EtOH) at indicated mol percent EtOH in IPrOH (Binary Alcohol Basis) | | | |
|---|---|---|---|---|
| | 10 | 50 | 90 | 100 |
| 97 | 1.53 | 1.58 | 1.64 | 1.67 |
| 92 | 1.43 | 1.48 | 1.53 | 1.54 |
| 61 | 1.03 | 1.10 | 1.16 | |

TABLE IV

*Relative volatility of Sec-BuOH to n-PrOH as a function of alcohol ratio*

| Mol Percent $H_2O$ | Alpha (Sec-BuOH: n-PrOH) at indicated mol percent n-PrOH in Sec-Bu OH (Binary alcohol basis) | | |
|---|---|---|---|
| | 10 | 50 | 90 |
| 97 | 1.68 | 1.71 | 1.74 |
| 91 | 1.38 | 1.45 | 1.52 |

TABLE V

*Relative volatility of iso-BuOH to EtOH as a function of alcohol ratio*

| Mol Percent $H_2O$ | Alpha (iso-BuOH:EtOH) at indicated mol percent EtOH in iso-BuOH (Binary Alcohol Basis) | |
|---|---|---|
| | 50 | 90 |
| 97 | 2.14 | 2.68 |
| 92 | 1.26 | 1.92 |
| 91 | 1.15 | 1.63 |
| 89 | 1.02 | 1.40 |

The following Table VI shows the water concentrations to be employed in various fractionations for the separation of normal primary alcohols from branched alcohols:

TABLE VI

| Mixture Being Separated | Water Concentration Levels (Mol Percent) | |
|---|---|---|
| | Above Mixture Feed-Point | Below Mixture Feed-Point |
| EtOH from IPrOH | 90–100; pref. 97 | 85–95; pref. 92. |
| sec-BuOH from n-PrOH | 92–100; pref. 97 | 80–92; pref. 91. |
| iso-BuOH from n-PrOH | 92–100; pref. 97 | 80–92; pref. 91. |
| IPrOH and branched butanols from EtOH and n-PrOH. | 92–100; pref. 97 | 87–92; pref. 89. |

From the foregoing discussion of the principles and examples of their use, it is to be noted that in accordance with the present invention optimum conditions for separating purified vapor products as well as purified bottoms products are obtained in an extractive distillation with water by using different water concentration levels in accomplishing the separations, thus permitting more complete recovery and separation without excessive loading of the concentration equipment.

In the previous discussion of the drawings illustrating the process the usual auxiliaries such as reboilers, condensers, pumps, heat exchangers, valves and automatic control valves have been omitted for clarity, but the use of these auxiliaries in the application of this invention is to be understood as within the scope of the person skilled in the art.

The distillation process described in this invention may be carried out at atmospheric pressure, sub-atmospheric pressure or at superatmospheric. The use of superatmospheric pressure may be desirable when separating higher molecular weight alcohols (butanols and higher) because of the advantage of higher operating temperatures and hence greater alcohol solubility in the solvent phase.

What is claimed is:

1. In the separation of a normal primary alcohol from a branched alcohol by extractive distillation employing water as the extractive distillation solvent to modify the relative volatilities of said alcohols, said alcohols having 2 to 5 carbon atoms per molecule and forming aqueous azeotropes which differ in boiling points by less than 5° C., the improvement which comprises, introducing a mixture of the alcohols into an intermediate point of a fractional distillation zone having a rectification section above the alcohol feed-point and a stripping section below said feed-point, introducing sufficient water to an upper portion of the rectification section to maintain an internal liquid reflux having a water content in the range of 90–100 mol % in the rectification section, distilling from said mixture vapors of the alcohols wherein the vapors flow countercurrent to the aqueous reflux, maintaining an internal liquid reflux having a substantially lower water content in the range of 80–95 mol % in the stripping section of the fractional distillation zone than the water content of the reflux in said rectification zone, recovering a dilute aqueous solution of the normal primary alcohol from a point near the bottom of the stripping section of the fractional distillation zone, and recovering a distillate comprising a higher proportion of the branched alcohol than of the normal primary alcohol from the rectification section of the fractional distillation zone.

2. In the separation of a normal primary alcohol from a branched alcohol by extractive distillation employing water as the extractive distillation solvent to modify the relative volatilities of said alcohols, said alcohols having 2 to 5 carbon atoms per molecule and forming aqueous azeotropes which differ in boiling points by less than 5° C., the improvement which comprises, introducing a mixture of said alcohols into a fractional distillation zone at an intermediate point thereof, introducing sufficient water into an upper section of the fractional distillation zone to maintain an internal liquid reflux having a water content in the range of 80–95 mol % above the alcohol mixture feed-point, withdrawing from a bottom portion of said fractional distillation zone a dilute aqueous solution of the normal alcohol, withdrawing from an upper part of the fractional distillation zone a distillate comprising a higher proportion of branched alcohol than of normal alcohols, introducing said distillate into a second fractionation zone at an intermediate point thereof, introducing sufficient water into an upper section of the second fractional distillation zone to maintain an internal liquid reflux having a substantially higher water content in the range of 90–100 mol % above the distillate feed-point than the water content in the aforementioned liquid reflux, and withdrawing overhead from the second fractional distillation zone branched alcohol substantially free of normal alcohol.

3. In the separation of isopropanol from ethanol by extractive distillation employing water as the extractive distillation solvent to modify the relative volatilities of the isopropanol with respect to ethanol the improvement which comprises, introducing a mixture of ethanol and isopropanol into an intermediate point of a fractional distillation zone having a rectification section above the alcohol feed-point and a stripping section below said feed-point, introducing sufficient water to an upper portion of the rectification section to maintain an internal liquid reflux having a water content in the range of 90–100 mol % in the rectification section, distilling from said mixture vapors of the alcohols wherein the vapors flow countercurrent to the aqueous reflux, maintaining an internal reflux having a substantially lower water content in the range of 85–95 mol % in the stripping section of a fractional distillation zone than the water content of the reflux in said rectification section, recovering a dilute aqueous solution of ethanol from a point near the bottom of the stripping section of the fractional distillation zone and recovering a distillate comprising a higher proportion of isopropanol than of ethanol from the fractional distillation zone.

4. A process according to claim 3 in which approximately 97 mol % water is maintained in the internal liquid reflux in the rectification section and approximately 92 mol % water is maintained in the internal aqueous reflux in the stripping section of the fractional distillation zone.

5. In the separation of a branched butanol from normal propanol by extractive distillation employing water as the extractive distillation solvent to modify the relative volatilities of the branched butanol with respect to normal propanol the improvement which comprises, introducing the mixture of branched butanol and normal propanol into an intermediate point of a fractional distillation zone having a rectification section above the alcohol feed-point and a stripping section below said feed-point, introducing sufficient water to an upper portion of the rectification section to maintain an internal liquid reflux having a water content in the range of 92–100 mol % in the rectification section, distilling from said mixture vapors of the alcohols wherein the vapors flow countercurrent to the aqueous reflux, maintaining an internal reflux having a substantially lower water content in the range of 80–92 mol % in the stripping section of a fractional distillation zone than the water content of the reflux in the rectification section, recovering a dilute aqueous solution of normal propanol from a point near the bottom of the stripping section of the fractional distillation zone and recovering a distillate comprising a higher proportion of the branched butanol than of normal propanol from the fractional distillation zone.

6. A process according to claim 5 in which approximately 97 mol % water is maintained in the internal aqueous reflux in the rectification section and approximately 91 mol % water is maintained in the internal aqueous reflux in the stripping section of the fractional distillation zone.

7. In the separation of isopropanol and a branched butanol from ethanol and normal propanol by extractive distillation employing water as the extractive distillation solvent to modify the relative volatilities of the isopropanol and branched butanol with respect to ethanol and normal propanol the improvement which comprises, introducing a mixture of said alcohols into an intermediate point of a fractional distillation zone having a rectification section above the alcohol feed-point and a stripping section below said feed-point, introducing sufficient water to an upper portion of the rectification section to maintain an internal liquid reflux having a water content in the range of 92–100 mol % in the rectification section, distilling from said mixture vapors of the alcohols wherein the vapors flow countercurrent to the aqueous reflux, maintaining an internal reflux having a substantially lower water content in the range of 87–92 mol % in the stripping section of a fractional distillation zone than the water content of the reflux in the rectification section, recovering a dilute aqueous solution of ethanol and normal propanol from a point near the bottom of the stripping section of the fractional distillation zone and recovering a distillate comprising a higher proportion of isopropanol and branched butanol than of ethanol and normal propanol from the fractional distillation zone.

8. A process according to claim 7 in which approximately 97 mol % water is maintained in the internal aqueous reflux in the rectification section and approximately 89 mol % water is maintained in the stripping section of the fractional distillation zone.

9. In the separation of a normal primary alcohol, from a branched alcohol by extractive distillation employing water as the extractive distillation solvent to modify the relative volatilities of said alcohols, said alcohols, having 2 to 4 carbon atoms per molecule and forming aqueous azeotropes which have boiling points that differ by less than 5° C. the improvement which comprises distilling a mixture of said alcohols in the presence of 80–85 mol. % water to obtain a first distillate comprising a higher proportion of branched alcohol than normal alcohol and a bottoms comprising an equous solution of normal alcohol, and fractionally distilling the first distillate in the presence of a substantially higher proportion of water in the range of 90–100 mol. % water to obtain a second distillate comprising branched alcohol substantially free of normal alcohol.

CARL S. CARLSON.

(References on following page)

References Cited

The following references are of record in the file of this patent:

UNITED STATES PATENTS

| Number | Name | Date |
|---|---|---|
| 887,793 | Guillaume | May 19, 1908 |
| 996,328 | Guillaume | June 27, 1911 |
| 2,290,442 | Metzl | July 21, 1942 |
| 2,350,256 | Shiras et al. | May 30, 1944 |

Other References

Young, "Distillation Principles and Processes" published 1922 by Macmillan and Company, Ltd., St. Martin Street, London, England. Pages 287 (last paragraph) 288, 289.

Mariller, "Distillation et Recitfication Des Liquides Industriales," published 1925 by Dunod 192 Rue Bonaparte (VI), Paris, France. Pages 101–106, 428–433.